March 14, 1961 D. N. GOLDBERG 2,974,771
ADJUSTABLE LENGTH FRICTION UNIT ASSEMBLY
FOR BRAKE OR CLUTCH STRUCTURES
Filed Sept. 25, 1957
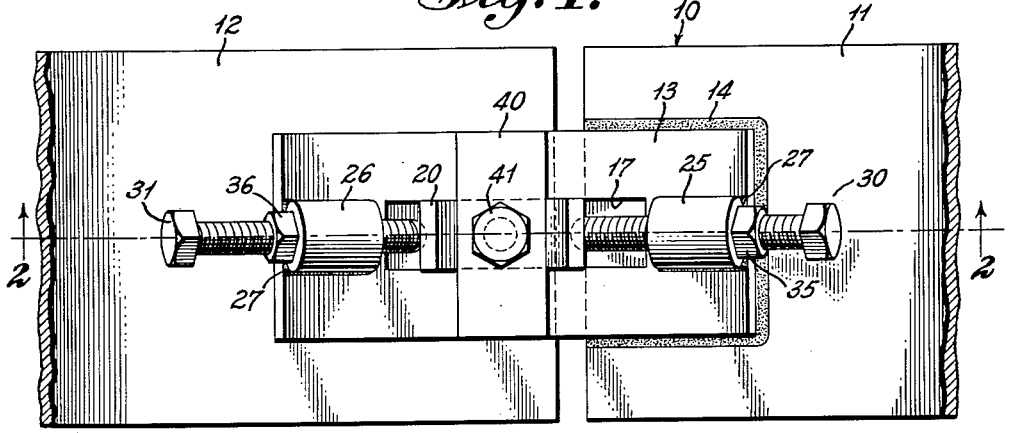
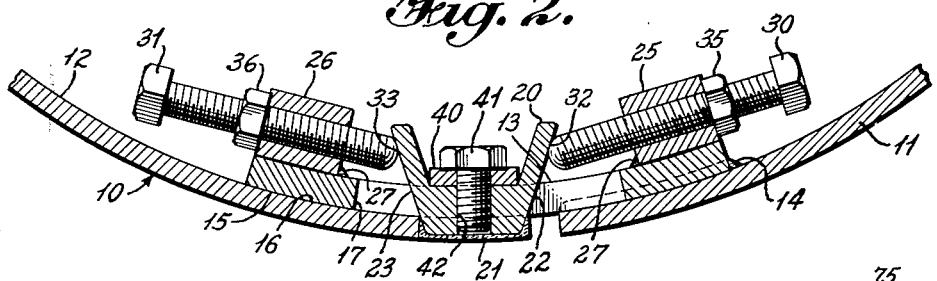
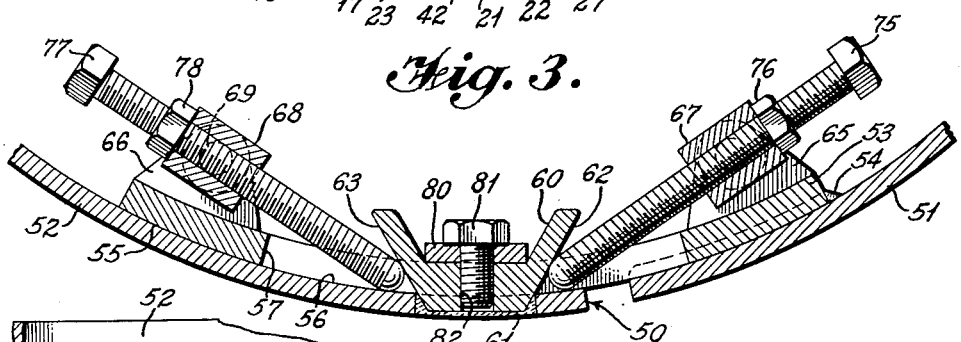
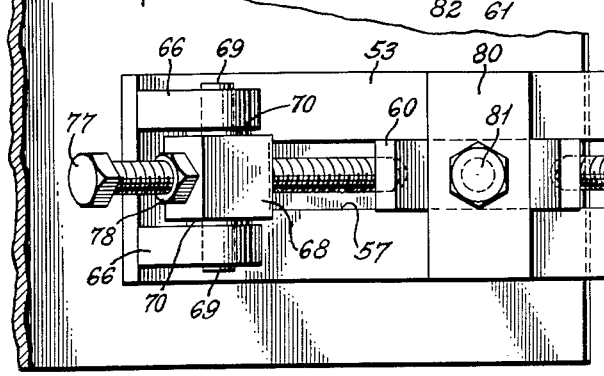
INVENTOR.
David N. Goldberg
BY Burns, Doane,
Benedict & Irons
ATTORNEYS United States Patent Office 2,974,771
Patented Mar. 14, 1961

2,974,771
ADJUSTABLE LENGTH FRICTION UNIT ASSEMBLY FOR BRAKE OR CLUTCH STRUCTURES

David N. Goldberg, 1510 Main St., Wheeling, W. Va.

Filed Sept. 25, 1957, Ser. No. 686,225

13 Claims. (Cl. 192—107)

This invention relates generally to the construction of friction unit assemblies for brake or clutch structures. As used herein, friction unit assembly refers to the various devices, in the form of bands, shoes, etc., which carry a friction lining material whereby such material is moved into engagement with the exterior or interior of a brake or clutch drum surface to effect the braking or clutching action. Such an assembly may be continuous or sectionalized with articulated joints interconnecting adjoining ends of adjacent sections of the shoe or band. More specifically, the invention is directed to a friction unit assembly including therein separate arcuate elements interconnected at their adjoining ends to permit adjustment of the arcuate length of the assembly to compensate for wear of the friction material carried by the elements and to adjust for most effective operation with the particular brake or clutch actuating mechanism and dead end connection with which the assembly is used.

In brake and clutch structures of the prior art, various devices have been suggested to facilitate adjustment of the overall arcuate length and/or arcuate configuration of friction unit assemblies cooperable with the cylindrical surface of a brake or clutch drum. These interconnections have been developed for use both with internal and external brake and clutch structures.

A particular problem encountered in providing a suitable interconnection for arcuate elements in a friction unit assembly has been the difficulty of achieving a connection of adequate strength to avoid buckling of the connection between adjoining ends of the arcuate elements, which buckling results in premature wear of the lining material adjacent the connection. Prior proposals have lacked adequate guiding action so that in shortening or elongation of the friction unit assembly, the interconnected elements will be guided along a predetermined arcuate path. A further failing of the prior art proposals has been the inability of the interconnecting parts to be drawn tight into a rigid connection with the arcuate elements lying in a circular arc of a predetermined radius once the length of the assembly has been adjusted to the desired point.

It is a primary object of this invention to provide an improved connection between arcuate elements of a friction unit assembly such that the arcuate elements are positively guided in longitudinal length adjustment of the assembly and restrained to lie in a circular arc of a predetermined radius in the finally adjusted state of the assembly.

It is also an object of this invention to provide a friction unit assembly having separate arcuate elements interconnected by cooperating arcuate surfaces corresponding to the arc of the elements, with an abutment member having generally oppositely facing surfaces carried by one element, and means engaging such oppositely facing surfaces carried by the other element, to permit adjustment of the friction unit assembly length.

It is a further object of this invention to provide a friction unit assembly having arcuate elements connected by cooperating arcuate surfaces sliding engaging to guide the longitudinal arcuate length adjustments of the assembly with an abutment member carried by one of said elements having surfaces flaring away from the arcuate surface of the element and wherein longitudinally adjustable means are provided engaging the abutment member surfaces to draw the elements together and adjust the length of the assembly.

An additional object of this invention is to provide a friction unit assembly in accordance with the hereinabove recited objects, wherein independent clamping means are provided to insure rigid interconnection of the arcuate elements in desired circular arc when the assembly is in its final length adjusted state.

It is another object of the instant invention to provide a friction unit assembly as recited in the above objects, wherein the longitudinally adjustable means are pivotally mounted to engage the abutment surfaces and further assist in rigidly connecting the arcuate elements together.

The above and other more specific objects of the invention will become apparent by reference to the hereinafter set forth detailed description of preferred embodiments of the invention which is given in conjunction with the accompanying drawings, and in which:

Figure 1 is a plan view of a portion of a friction unit assembly embodying the connection of the instant invention between adjoining ends of arcuate elements in the assembly;

Figure 2 is a sectional view taken on line 2—2 of Figure 1;

Figure 3 is a sectional view similar to Figure 2, but showing a modification of the connection between the arcuate elements; and Figure 4 is a partial plan view of the connection shown in Figure 3.

Referring to Figures 1 and 2, a portion of a friction unit assembly 10 is shown. This portion includes a pair of arcuate elements 11 and 12. The arcuate elements 11 and 12 are connected at their adjoining ends by mechanism which insures retention of the elements in a circular arc of predetermined radius so that the arcuate friction material carrying surfaces of the elements form a continuation of one another, with such arcuate surfaces lying in a common cylindrical surface. In use, these arcuate elements are provided with suitable friction material (not shown) which may take the form of brake lining material, as is well recognized in the art.

The assembly illustrated is adapted for use with an internal brake or clutch structure. In other words, the type of friction unit illustrated is to engage with the inwardly facing cylindrical surface of a brake or clutch drum. It will be readily recognized that within the scope of this invention the curvature of arcuate elements 11 and 12 can be such as to be useable with external brake or clutch structures where the friction unit assembly engages the outwardly facing cylindrical surface of the brake or clutch drum.

Element 11 has a plate 13 secured thereto as by welding 14. This plate extends longitudinally beyond the end of element 11, and in connection of such element with arcuate element 12, provides an arcuate guide surface 15 which slidably cooperates with the arcuate surface 16 of element 12. Plate 13 is provided with a rectangular opening 17.

An abutment member 20 is secured to the end of arcuate element 12 as by means of welding 21, the end of element 12 being slotted to nestingly receive the lower portion of abutment member 20 where it is welded to element 12. The abutment member extends upwardly through opening 17 in plate 13 as shown in Figure 2.

Abutment member 20 provides generally oppositely directed abutment surfaces 22 and 23. The abutment member is formed with these abutment surfaces flaring outwardly from each other as they extend away from the end of element 12 to which the abutment member is secured. This disposition of the abutment surfaces is important in obtaining the rigid connection in length adjustment of the assembly for reasons made more apparent hereinbelow.

Plate 13 is provided with internally threaded sleeves 25 and 26 adjacent its opposite ends. These sleeves are shown as being separate from plate 13 and fixedly secured thereto by welding 27. It will be readily appreciated that the internally threaded bore provided by each of sleeves 25 and 26 may be formed by means other than the use of separate sleeves welded to the plate 13.

Axially adjustable bolts 30 and 31 are threaded into the internally threaded sleeves 25 and 26 respectively, with the ends 32 and 33 of such bolts engaging the oppositely facing abutment surfaces 22 and 23 respectively, of abutment member 20. A lock nut 35 may be provided on bolt 30 to lockingly engage the end of sleeve 35 to retain bolt 30 against rotation once the desired adjustment of the connection has been effected. A similar lock nut 36 may be provided for the same purpose with respect to bolt 31.

A transverse bar 40 is provided extending across abutment member 20 with the ends thereof overlying the bridging portions of plate 13 on both sides of the abutment member and opening 17. A bolt 41 extends through an aperture in bar 40 and is threaded into an internally threaded bore 42 in the abutment member. As will be apparent from the description hereinbelow, bar 40 and bolt 41 cooperate to lockingly retain the adjoining ends of the arcuate elements in the desired adjusted position.

From the structure described hereinabove, the functioning and operation of the invention will be readily apparent. In adjusting the friction unit assembly to compensate for wear of the friction material carried thereby, and also to adjust the assembly for cooperation and proper operation with the particular dead end and live end mechanisms with which the assembly is to be used, the arcuate elements 11 and 12 are adjusted longitudinally relative to each other. By retracting adjusting bolt 31 and taking up adjusting bolt 30 with its lock nut 35 out of engagement with the end of sleeve 25, the arcuate element 11 will be moved longitudinally away from arcuate element 12. Similarly, by backing off bolt 30 and taking up bolt 31, the engagement of bolt 31 with abutment member 20 will cause the elements 11 and 12 to move toward one another. It will be recognized that this adjusting movement between the elements 11 and 12 is at all times guided by the sliding engagement of surface 15 on plate 13 with the arcuate surface 16 of element 12.

The outwardly flaring disposition of abutment surfaces 22 and 23 in relation to the direction of the longitudinal axes of the adjusting bolts 30 and 31, insures that as the bolts are drawn up tight, a wedging action will take place, tending to pull the abutment member 20 and the end of element 12 to which it is secured into firm seating engagement with the arcuate surface 15 of plate 13. Thus, the engagement of bolt ends 32 and 33 with member 20 acts to wedge the abutment member upwardly through opening 17 in plate 13.

Once the desired longitudinal adjustment between elements 11 and 12 has been effected, the bolts 30 and 31 are firmly engaged with the respective oppositely facing surfaces of abutment member 20 and the lock nuts 35 and 36 are moved into locking position in engagement with the ends of the sleeves 25 and 26 respectively. The bolt 41 is tightened to urge bar 40 into firm frictional engagement with plate 13 and thereby assist in drawing the end of element 12 into tight engagement with the surface 15 of plate 13. It will further be seen that bar 40, by overlying plate 13 as it does, serves to guide sliding movements between plate 13 and element 12 during the adjusting operation. When the desired arcuate length adjustment has been made, the connection is effectively rigid.

In the embodiment of Figures 3 and 4, a somewhat similar connection between arcuate elements in a friction unit assembly is illustrated. In this embodiment, the friction unit assembly 50 includes a pair of arcuate elements 51 and 52. A connecting mechanism is provided between the adjoining ends of these elements to permit adjustment of the arcuate length of the friction unit assembly.

A plate 53, secured as by welding 54 to one end of element 51, has a portion provided with an arcuate surface 55 which overlies and slidingly cooperates with the arcuate surface 56 of element 52. This plate is provided with a rectangular opening 57.

An abutment member 60 is seated and secured by welding 61 in an aperture provided adjacent the end of arcuate element 52. Abutment member 60 extends upwardly through opening 57 and is provided with generally oppositely directed abutment surfaces 62 and 63, which, as in the case of the previously described embodiment, flare outwardly with respect to one another as they extend away from element 52.

Plate 53 has adjacent the opposite ends thereof pairs of trunion supports 65 and 66. Mounted on trunions between supports 65 is an internally threaded sleeve 67 with the axis of the internally threaded bore therein intersecting and perpendicular to the pivot axis mounting the sleeve on supports 65. Similarly, an internally threaded sleeve 68 is pivotally mounted between supports 66 with the internally threaded bore therein intersecting and perpendicular to the pivot axis mounting the sleeve on supports 66.

As shown more clearly in Figure 4, the sleeve 68 has trunions 69 extending from diametrically opposite sides of the sleeve and pivotally engaging in bores provided in the respective supports 66. To center the sleeve 68 between supports 66, suitable washers 70 are provided. It will be recognized that a similar type of pivotal mounting is provided for sleeve 67.

An adjusting bolt 75 is threaded through the internally threaded bore of sleeve 67 with the end thereof engaging abutment surface 62 as shown in Figure 3. A lock nut 76 is provided on bolt 75 to engage with the end of sleeve 67 to lock the bolt against rotation once the desired adjusted position has been obtained.

An adjusting bolt 77 is threaded through the internally threaded bore of sleeve 68 with the end thereof engaging abutment surface 63 and the adjacent surface of arcuate element 52. A lock nut 78 is provided on bolt 77 to engage the end of sleeve 68 to retain the bolt against rotation as desired.

A bar 80, similar to bar 40 in the previously described embodiment, is provided with a bolt 81 threaded into an internally threaded bore 82 in abutment member 60.

The adjusting operation undertaken in the embodiment of Figures 3 and 4 is generally similar to that described hereinabove with respect to Figures 1 and 2. It will be seen that appropriate movement of bolts 75 and 77 will be effective to elongate or shorten the arcuate length of the friction unit assembly by movement of the adjoining ends of elements 51 and 52 toward or away from each other. The lock nuts 76 and 78 may be employed to lock the bolts 75 and 77 against movement once the desired longitudinal length of the assembly is achieved. The bar 80, drawn down tight against the abutment member and the bridging portions of plate 53 on opposite sides of the abutment member and opening 57, serves to retain the end of element 52 in proper cooperation with arcuate surface 55 of plate 53.

In the embodiment of Figures 3 and 4, the pivotal mounting of sleeves 67 and 68 permits such sleeves to adjust and compensate as the bolts 75 and 77 are moved to effect appropriate shortening or elongation of the assembly. In this embodiment, the adjusting force applied by the bolts is directed at points closely adjacent the exterior arcuate surface of the elements 51 and 52 which form a part of the assembly.

I have shown and described herein only two preferred emobdiments of my invention. It is contemplated that various changes and alterations may be made in the embodiment disclosed, all within the scope of the appended claims.

Having thus described my invention, I claim:

1. In a friction unit assembly for a brake or clutch structure, at least two arcuate elements disposed in longitudinal end to end alignment and movable as a unit toward engagement with a drum surface upon operating force being applied to said assembly, each of said elements having one arcuately curved face thereof adapted to receive friction material with the arcuately curved surface of one element forming a continuation of the arc of curvature of the arcuately curved surface of the other element to provide an essentially unobstructed friction material receiving surface on said assembly in the form of a partial cylinder, means providing slidably engaging complementary arcuate guide surfaces on said elements opposite the friction material receiving faces thereof, abutment means on one of said elements providing oppositely directed abutment surfaces extending generally away from the friction material receiving faces of said elements, and means on the other of said elements adjustably engageable with said abutment surfaces, said last named means being operable to effect selective movement of said abutment means relative to said other of said elements to adjust the spatial relationship between said elements.

2. In a friction unit assembly for a brake or clutch structure, at least two arcuate elements disposed in longitudinal end to end alignment and movable as a unit toward engagement with a drum surface upon operating force being applied to said assembly, each of said elements having one arcuately curved face thereof adapted to receive friction material with the arcuately curved surface of one element forming a continuation of the arc of curvature of the arcuately curved surface of the other element to provide an essentially unobstructed friction material receiving surface on said assembly in the form of a partial cylinder, means providing an arcuate guide surface on the face of one of said elements opposite the friction material receiving face thereof, means providing a complementary arcuate guide surface on the other of said elements, said complementary arcuate guide surface slidably engaging said first mentioned arcuate surface, abutment means on said one element providing oppositely directed abutment surfaces extending generally away from the friction material receiving faces of said elements, and means on said other element adjustably engageable with said abutment surfaces, said last named means being operable to effect selective movement of said abutment means relative to said other element to adjust the spatial relationship between said elements.

3. In a friction unit assembly as recited in claim 2 wherein said abutment surfaces diverge relative to each other as they extend away from said elements.

4. In a friction unit assembly for a brake or clutch structure, at least two arcuate elements disposed in longitudinal end to end alignment and movable as a unit toward engagement with a drum surface upon operating force being applied to said assembly, each of said elements having one arcuately curved face thereof adapted to receive friction material with the arcuately curved surface of one element forming a continuation of the arc of curvature of the arcuately curved surface of the other element to provide an essentially unobstructed friction material receiving surface on said assembly in the form of a partial cylinder, means providing an arcuate guide surface on the face of one of said elements opposite the friction material receiving face thereof, means providing a complementary arcuate guide surface on the other of said elements, said complementary arcuate guide surface slidably engaging said first mentioned arcuate surface, an abutment member on said one element and providing oppositely directed abutment surfaces extending generally away from the friction material receiving faces of said elements, and axially adjustable means on said other element engaging with said abutment surfaces to effect movement of the adjoining ends of said elements relative to each other in varying the arcuate length of said assembly while retaining said elements in a circular arc of predetermined radius.

5. In a friction unit assembly for a brake or clutch structure, at least two arcuate elements disposed in longitudinal end to end alignment and movable as a unit toward engagement with a drum surface upon operating force being applied to said assembly, each of said elements having one arcuately curved face thereof adapted to receive friction material with the arcuately curved surface of one element forming a continuation of the arc of curvature of the arcuately curved surface of the other element to provide an essentially unobstructed friction material receiving surface on said assembly in the form of a partial cylinder, means providing an arcuate guide surface on the face of one of said elements opposite the friction material receiving face thereof, a guide member on the other of said elements and having a portion thereof overlying said guide surface with a complementary arcuate guide surface on said member slidably engaging said first mentioned guide surface, an abutment member on said one element and providing oppositely directed abutment surfaces extending generally away from the friction material receiving faces of said elements, and means on said other element adjustably engageable with said abutment surfaces, said last named means being operable to effect selective movement of said abutment member relative to said guide member to adjust the spatial relationship between said elements.

6. In a friction unit assembly for a brake or clutch structure, at least two arcuate elements disposed in longitudinal alignment, each of said elements having one face thereof adapted to receive friction material, means providing an arcuate guide surface on the face of one of said elements opposite the friction material receiving face thereof, a guide member on the other of said elements and having a portion thereof overlying said guide surface with a complementary arcuate guide surface on said member slidably engaging said first mentioned guide surface, an abutment member on said one element and extending substantially radially relative to the friction material receiving faces of said elements to provide oppositely directed abutment surfaces, a pair of oppositely extending adjusting means carried by said other element having the respective ends thereof engaging said abutment surfaces to effect movement of the adjoining ends of said elements relative to each other in varying the arcuate length of said assembly while retaining said elements in a circular arc of predetermined radius.

7. In a friction unit assembly as recited in claim 6 wherein said abutment surfaces diverge relative to each other as they extend away from said elements.

8. In a friction unit assembly for a brake or clutch structure, at least two arcuate elements disposed in longitudinal alignment, each of said elements having one face thereof adapted to receive friction material, means providing an arcuate guide surface on the face of one of said elements opposite the friction material receiving face thereof, a guide member on the other of said elements and having a portion thereof overlying said guide surface with a complementary arcuate guide surface on said member slidably engaging said first mentioned guide surface, an abutment member on said one element and providing oppositely directed abutment surfaces extending generally away from the friction material receiving faces of said elements, said abutment surfaces diverging relative to each other as they extend away from said elements, and means on said other element adjustably engageable with said abutment surfaces, said last named means being operable to effect selective movement of said abutment member relative to said guide member to adjust the longitudinally aligned position of said elements.

9. In a friction unit assembly as recited in claim 8, wherein said last named means includes a first axially adjustable member engageable with one of said abutment surfaces and a second axially adjustable member engageable with the other of said abutment surfaces.

10. In a friction unit assembly as recited in claim 9 wherein each of said axially adjustable members is pivotally mounted on an axis extending transversely of the friction material receiving faces of said elements.

11. In a friction unit assembly for a brake or clutch structure, at least two arcuate elements disposed in longitudinal end to end alignment and movable as a unit toward engagement with a drum surface upon operating force being applied to said assembly, each of said elements having one arcuately curved face thereof adapted to receive friction material with the arcuately curved surface of one element forming a continuation of the arc of curvature of the arcuately curved surface of the other element to provide an essentialy unobstructed friction material receiving surface on said assembly in the form of a partial cylinder, means providing an arcuate guide surface on the face of one of said elements opposite the friction material receiving face thereof, a guide member on the other of said elements and having a portion thereof overlying said guide surface with a complementary arcuate guide surface on said member slidably engaging said first mentioned guide surface, an abutment member on said one element and providing oppositely directed abutment surfaces extending generally away from the friction material receiving faces of said elements, means on said other element adjustably engageable with said abutment surfaces to effect selective movement of said abutment member relative to said guide member to adjust the longitudinally aligned position of said elements, and means overlying a portion of said abutment member and said guide member to retain said elements in a circular arc of predetermined radius.

12. In a friction unit assembly for a brake or clutch structure, at least two arcuate elements disposed in longitudinal alignment, each of said elements having one face thereof adapted to receive friction material, means providing an arcuate guide surface on the face of one of said elements opposite the friction material receiving face thereof, means providing a complementary arcuate guide surface on the other of said elements slidably engaging said first mentioned arcuate surface, abutment means carried by said one element providing oppositely directed abutment surfaces extending generally away from the friction material carrying faces of said elements, axially adjustable means carried by said other element engaging with said abutment surfaces to effect movement of the adjoining ends of said elements relative to each other in varying the arcuate length of said assembly, said axially adjustable means being pivotally mounted on axes extending transversely relative to the friction material receiving faces of said elements, and means retaining said guide surfaces in sliding relation to maintain said elements in a circular arc of predetermined radius.

13. In a friction unit assembly as recited in claim 12 wherein said axially adjustable means includes a first adjusting stud engageable with one of said abutment surfaces and a second adjusting stud engageable with the other of said abutment surfaces and said abutment surfaces diverge relative to each other as they extend away from said elements.

References Cited in the file of this patent

UNITED STATES PATENTS

| | | |
|---|---|---|
| Re. 12,532 | Blaw | Sept. 18, 1906 |
| 799,559 | Groscop | Sept. 12, 1905 |
| 1,121,840 | Hunter | Dec. 22, 1914 |
| 1,523,712 | Proben | Jan. 20, 1925 |
| 1,665,999 | Byerlein | Apr. 10, 1928 |
| 1,762,624 | Higgins | June 10, 1930 |
| 2,574,622 | Clark | Nov. 13, 1951 |